United States Patent [19]
Ohzu

[11] Patent Number: 4,851,917
[45] Date of Patent: Jul. 25, 1989

[54] SOLID STATE IMAGE PICKUP APPARATUS WITH INTERLACED ROW PAIR READOUT

[75] Inventor: Hayao Ohzu, Fuchu, Japan

[73] Assignee: Canon Kabushiki Kaisha, Tokyo, Japan

[21] Appl. No.: 944,864

[22] Filed: Dec. 22, 1986

[30] Foreign Application Priority Data

Dec. 25, 1985 [JP] Japan ................... 60-295314

[51] Int. Cl.⁴ .............................................. H04N 3/14
[52] U.S. Cl. ............................ 358/213.22; 358/213.29
[58] Field of Search ..................... 358/213.22, 213.27, 358/213.29, 212

[56] References Cited

U.S. PATENT DOCUMENTS

| 4,011,441 | 3/1977 | Michon et al. | 358/213.27 |
| 4,212,034 | 7/1980 | Kokie et al. | 358/213 |
| 4,392,158 | 7/1983 | Aoki et al. | 358/213.22 |
| 4,413,283 | 11/1983 | Aoki et al. | 358/213.22 |
| 4,587,562 | 5/1986 | Imai et al. | 358/212 |
| 4,603,355 | 7/1986 | Yamada et al. | 358/213.22 |
| 4,731,665 | 3/1988 | Hashimoto | 358/213.27 |
| 4,768,085 | 8/1988 | Hashimoto | 358/48 |

FOREIGN PATENT DOCUMENTS

| 2834761 | 2/1979 | Fed. Rep. of Germany . |
| 3345135 | 6/1984 | Fed. Rep. of Germany . |
| 52-155010 | 12/1977 | Japan . |
| 54-29517 | 3/1979 | Japan . |
| 60-12764 | 1/1985 | Japan . |

Primary Examiner—Jin F. Ng
Assistant Examiner—Stephen Brinich
Attorney, Agent, or Firm—Fitzpatrick, Cella, Harper & Scinto

[57] ABSTRACT

A solid state image pickup apparatus comprising photoelectric conversion elements arranged in a two-dimension, and switching elements and a scanning circuit for scanning the photoelectric conversion elements horizontally and vertically. One of two adjoining scanning outputs of the scanning circuit is input to a control terminal of a switching element for scanning two adjoining rows of the photoelectric conversion elements. The other of the two adjoining scanning outputs of the scanning circuit is input to a control terminal of a switching element for scanning only two adjoining rows of the photoelectric conversion elements, the just mentioned two rows of the photoelectric conversion elements being shifted by one row relative to the first-mentioned two adjoining rows of the photoelectric conversion elements.

19 Claims, 12 Drawing Sheets

SOLID STATE IMAGE PICKUP APPARATUS WITH INTERLACED ROW PAIR READOUT

BACKGROUND OF THE INVENTION

1. Field of the Invention

The present invention relates to a solid state image pickup apparatus which integrates an array of photoelectric conversion elements arranged on a semiconductor substrate, and a scanning circuit for extracting optical information from these photoelectric conversion elements.

2. Related Background Art

A solid state image pickup apparatus converts spatial two-dimensional optical information to an electrical signal in a time series, and generally has an photoelectric conversion function and a scanning function.

In order to reduce the image bandwidth and to obtain an image of high resolution and low flicker, the standard television system employs a so-called interlacing system which scans horizontal scanning lines alternately and forms a picture (one frame) from two fields.

Conventionally, an interlacing system is proposed which selects horizontal scanning lines two by two in a different combination in each field (Unexamined Published Patent Application No. 155010/1977). Also, a circuit structure which embodies this system has been proposed (Unexamined Published Patent Application No. 29517/1979). These prior arts will now be described with reference to the drawings.

Figure 4A:
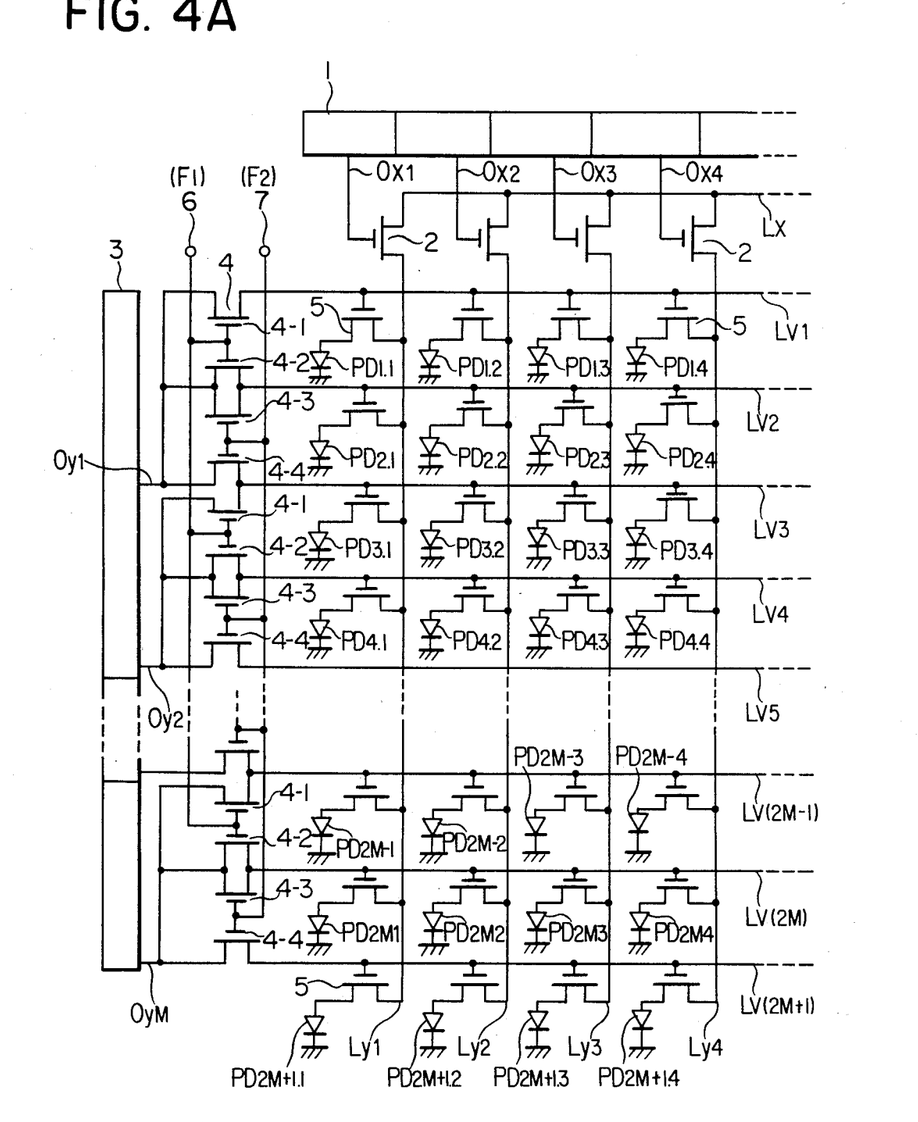
FIG. 4A is a schematic of the circuit of the prior art structure.
Figure 4B:
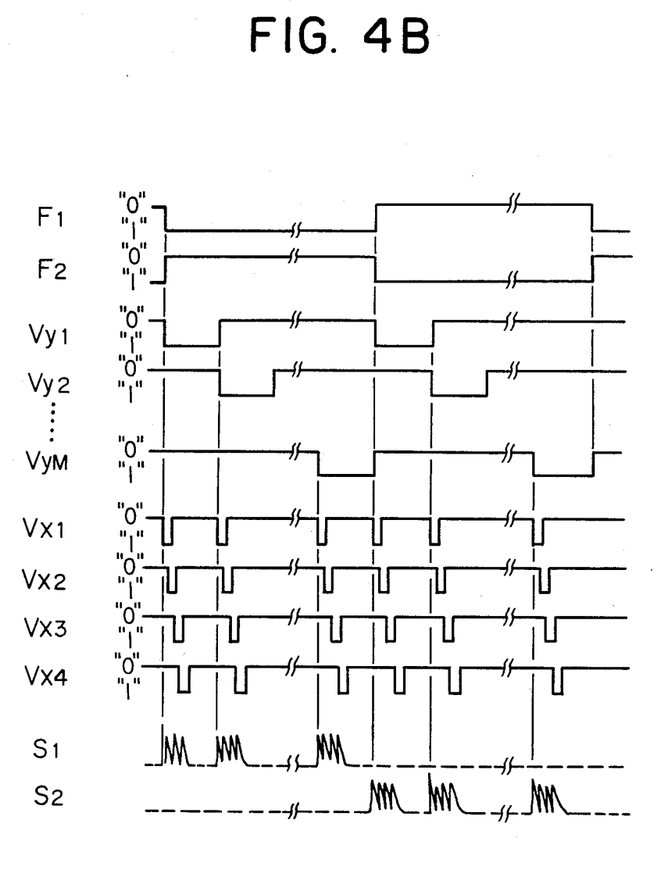
FIG. 4B is an operational timing of the prior art structure.

FIGS. 4A and 4B show a first circuit structure for the prior art interlaced scanning and the operational timing of the structure. In FIG. 4A, a horizontal scanning circuit 1 produces scanning pulses to open and close horizontal switching MOS field effect transistors (hereinafter refers to MOSTs) 2. Reference numeral 3 denotes a vertical scanning circuit. Reference numerals 4-1, 4-2, 4-3 and 4-4 denote interlacing selector switches. These switches each may include a MOS transistor. These switches are connected at one end (for example, source) to the corresponding stage output Oy1, Oy2, ... OYM of a unit circuit included in the vertical scanning circuit 3 and at the other end (for example, drain) to lines Lv (Lv1, Lv2, Lv3, Lv4, Lv5, ... Lv(2M-1), Lv(2M), Lv(2M+1) to each of which the gates of corresponding vertical switching MOSTs 5 are connected in common. One picture (hereinafter referred to as one frame) is composed of two fields (a first field and a second field). Each pair of switches 4-1, 4-2 are opened and closed by a first field pulse F1 applied to a terminal 6 to form a first field while each pair of switches 4-3, 4-4 are opened and closed by a second field pulse F2 applied to a terminal 7 to form a second field. Photodiodes PD include corresponding sources of MOSTs 5. Vertical signal output lines Ly (Ly1, Ly2, Ly3 ... ) each have sources of corresponding MOSTs 5 connected thereto. A horizontal signal output line Lx has drains of MOSTs 2 connected thereto in common.

In this prior art, as shown in the timing chart of FIG. 4B, vertical scanning circuit 3 is clocked by clock pulses to sequentially output scanning pulses Vy1, Vy2, ... VyM, which are shifted by a predetermined timing time (1H interval) in a field relative to the circuit stage outputs Oy1, Oy2, ... OyM sequentially.

A horizontal scanning circuit 1 outputs scanning pulses Vx1, Vx2, Vx3, Vx4, ... sequentially to the respective stage outputs Ox1, Ox2, Ox3, Ox4, ... of a unit circuit included therein.

Two vertical and horizontal scanning pulses designate a position (X, Y), and the optical signal charges stored in the photodiode PD at that position during a field interval is read through the corresponding vertical and horizontal switches 5 and 2 onto the output line Lx. Such reading is performed sequentially at other positions.

The operation of this prior art will be described in more detail with respect to the timing chart of FIG. 4B.

In a first field, a first field pulse F1 becomes "1" which is applied via the terminal 6 to the gates of switches 4-1, 4-2 to thereby render switches 4-1, 4-2 conductive. Therefore the respective stage outputs Oy1, Oy2, Oy3, ... OyM of vertical scanning circuit 3 are connected to corresponding pairs of scanning pulse application lines Lv1, Lv2; Lv3, Lv4; ... ; (Lv(2M-1), Lv(2M)).

In a second field, a second field pulse F2 becomes "1" which is applied via the terminal 7 to the gates of switches 4-3, 4-4 to thereby render switches 4-3, 4-4 conductive (switches 4-1, 4-2 are non-conductive), Therefore, the respective stage outputs Oy1, Oy2, Oy3, ... OyM of the vertical scanning circuit 3 are connected to corresponding pairs of scanning pulse application lines Lv2, Lv3; Lv4, Lv5; ... ; Lv(2M), Lv(2M+1)

Consequently, rows are selected two by two in a different combination in each field to thereby obtain two-line pixel synthesized signals S1, S2.

Figure 5A:
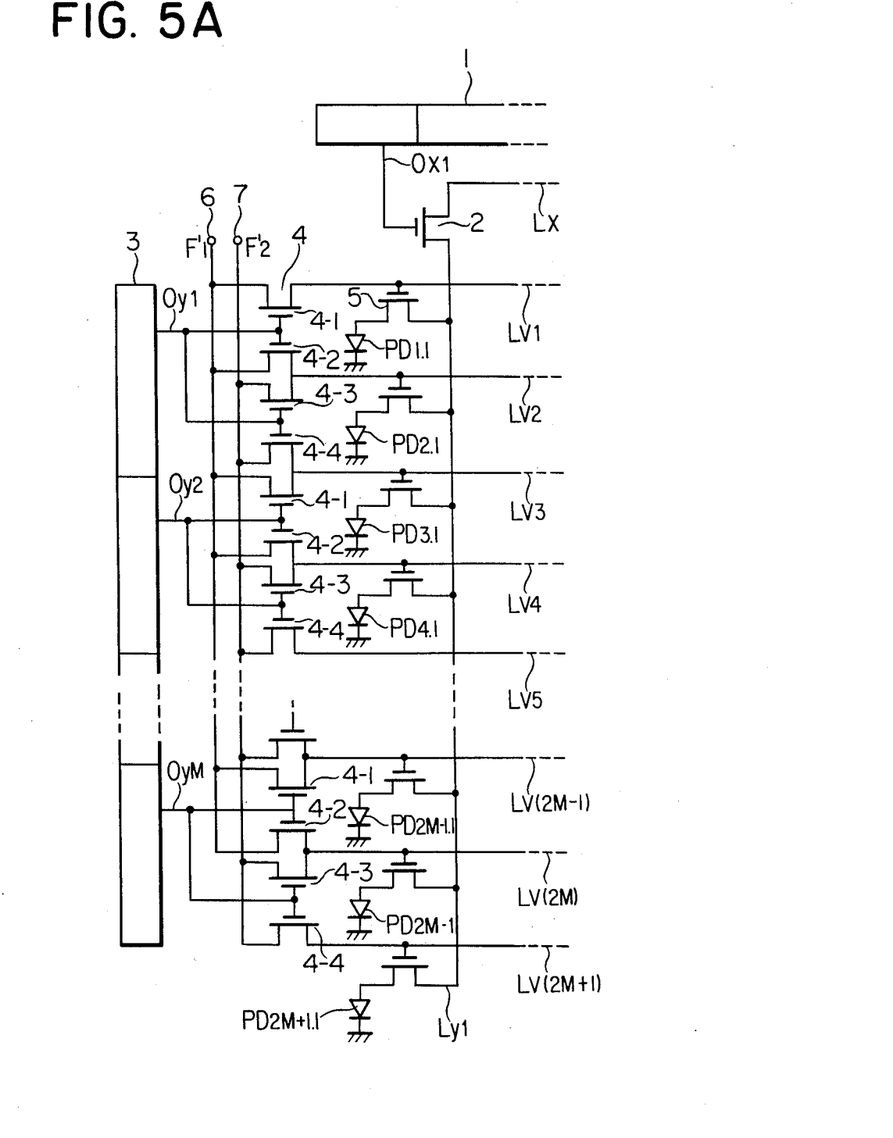
FIG. 5A is a schematic of the circuit of the second prior art structure and FIG. 5B is an operational timing chart of the second prior art structure.

FIG. 5 shows another prior art. In FIG. 5A, interlacing selector switches 4 (4-1, 4-2, 4-3, 4-4) have gates connected to the corresponding stage outputs Oy1, Oy2, ... OyM of a unit circuit included in vertical scanning circuit 3. The switches 4 are sequentially opened and closed by vertical scanning pulses Vy1, Vy2, ... VyM during each 1H. Terminals 6 and 7 receive first and second field pulses F1' and F2', respectively. Switches 4-1, 4-2 receive at one end (for example, source) first field pulse, and are connected at the other end (for example, drain) to vertical scanning pulse application line Lv. Switches 4-3, 4-4 receive at one end (for example, source) a second field pulse and are connected at the other end (for example, drain) to vertical scanning pulse application line Lv. In this example, when reading of a selected row is completed, the voltage stored on the scanning pulse application line Lv for the completed row must be discharged to the "0" level.

Figure 5B:
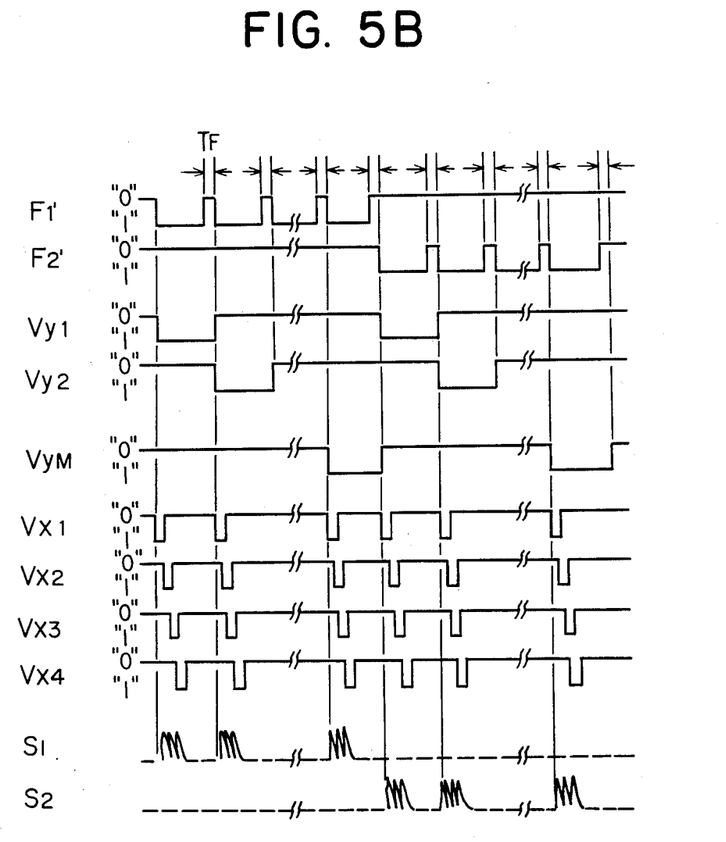

Therefore, as shown in the timing chart of FIG. 5B, the voltages of field pulses F1', F2' must be dropped to the "0" level a predetermined interval Tf before the "1" level interval of scanning pulses Vy1, Vy2 ... VyM ends. The interval Tf is only required to be sufficient for the voltage remaining on the scanning pulse application line to discharge from the "1" level to the "0" level via switch 4, and is only required to be set to a value within a horizontal blanking period (approximately 10 μs) provided for each horizontal interval. The relationship in timing between horizontal and vertical scanning pulses is similar to that of FIG. 4.

In the above two prior arts, there is a small number of components of the circuit to embody the interlaced scanning system. A pitch per vertical scanning circuit stage is reduced, so that the pitch at which pixels are arranged is reduced to thereby improve the resolution.

In the prior art shown in FIG. 4, the respective stage outputs Oy1-OyM of the unit circuit included in vertical scanning circuit drive vertical scanning pulse application lines Lv1-Lv(2M+1) to which a plurality of MOST gates are connected in common via selector switch MOSTs. Thus, the respective output stages of the unit circuit in the vertical scanning circuit must have the ability to drive the vertical scanning pulse application lines sufficiently. The drive ability is required to increase with the area of the circuit, so that the area where the vertical scanning circuit 3 is laid out increases. Such is the problem.

In the prior art shown in FIG. 5, an output pulse from the unit circuit included in the vertical scanning circuit 3 turns on four selector switches simultaneously, so that a conductive path is formed between the first field pulse application terminal F1' and the second field pulse application terminal F2'. Therefore, the operational timing of FIG. 5B cannot well drive vertical scanning pulse application lines.

SUMMARY OF THE INVENTION

It is a principle object of the present invention to solve the above prior art problems.

It is another object of the present invention to provide a solid state image pickup apparatus which includes a scanning circuit which comprises a small number of components, a small area where the circuit is laid out, and has a function to realize a reliable vertical scanning operation.

In order to achieve the above objects, according to one embodiment of the present invention, a solid state image pickup apparatus comprises a solid state image pickup apparatus comprising photoelectric conversion elements arranged in a two-dimension, switching elements and a scanning circuit for scanning the photoelectric conversion elements horizontally and vertically, wherein one of two adjoining outputs of the scanning circuit is input to a control terminal of a switching element for scanning only two adjoining rows of the photoelectric conversion elements while the other of the two joining scanning circuit outputs is input to a control terminal of a switching element for scanning only two adjoining rows of the conversion elements, the just mentioned two rows of the conversion elements being shifted by one row relative to the first-mentioned two adjoining rows of the conversion elements.

In the above structure, one of two adjoining scanning outputs scans only two adjoining rows of the conversion elements while the other of the adjoining scanning outputs scans another two adjoining rows of the conversion elements, which are shifted by one row relative to the former two adjoining rows.

According to the embodiment just described, the outputs from the scanning circuit are input to the corresponding control terminals of switching elements which each scan two rows of the conversion elements, so that the drive ability of the scanning outputs is minimized, a layout area per scanning circuit stage is also minimized, and the two adjoining scanning outputs from the scanning circuit are input to the corresponding control terminals of switching elements to scan only two rows and these two rows are shifted by one row relative to another two rows to be scanned next to thereby ensure reliable interlaced scanning.

According to another embodiment of the present invention, a solid state image pickup apparatus comprises:

a plurality of photoelectric conversion elements arranged in columns and rows, first selected means for simultaneously selecting predetermined n (n is an integer larger than 2) adjoining rows of the photoelectric conversion elements, said first selective means having a first control electrode, second selective means for selecting n adjoining rows of the photoelectric conversion elements, which rows are shifted by m (m is an integer smaller than n) rows relative to the first-mentioned n rows of the photoelectric conversion elements, the second selective means having a second control electrode, and scanning means for inputting control signals sequentially to the first and second control electrodes.

Thus the drive ability of the scanning means is reduced and the scanning means is also reduced in size.

Other objects and features of present invention will be apparent from the following description and the drawings.

BRIEF DESCRIPTION OF THE DRAWINGS

FIGS. 1A to 1C describe a first embodiment of a solid state image pickup apparatus according to the present invention wherein

FIGS. 2A and 2B illustrate a second embodiment of the solid state image pickup apparatus according to the present invention wherein

FIGS. 3A to 3C illustrate a third embodiment of the solid state image pickup apparatus according to the present invention wherein

FIGS. 4A and 4B illustrate a first prior art device wherein

FIGS. 5A and 5B illustrate a second prior art device wherein

DETAILED DESCRIPTION OF THE PREFERRED EMBODIMENTS

Embodiments of the present invention will now be described in detail with reference to the drawings.

FIG. 1 shows a first embodiment of the present invention.

Figure 1A:
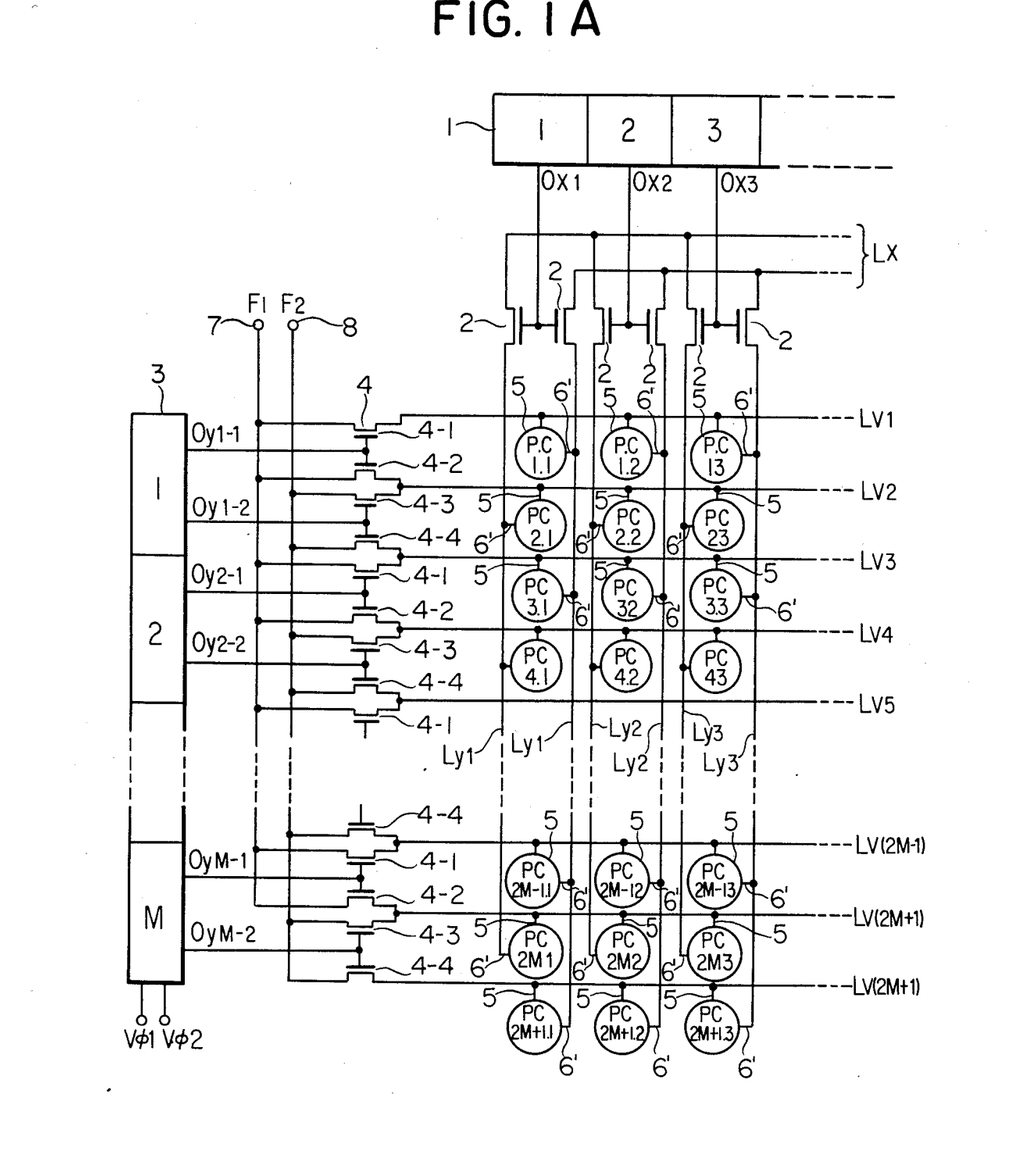
FIG. 1A is a schematic of the circuit of the first embodiment.

In FIG. 1A, a horizontal scanning circuit 1 outputs scanning pulses to open and close horizontal switching MOS field effect transistors (hereinafter referred to as MOSTs) 2. A vertical scanning circuit 3 outputs two pairs of scanning pulses which open and close interlacing selector switches 4-1, 4-2, 4-3, 4-4. When photoelectric conversion photosensitive elements PC receive a reading signal at their respective reading terminals 5, their optical information is read as electrical signals to there outputs 6'.

The interlacing selector switches 4 (4-1, 4-2, 4-3, 4-4) are each include a MOST. The gates of switches 4-1, 4-2 are connected to the corresponding outputs Oy1-1, Oy2-1, . . . OyM-1 of the respective stages of a unit circuit included in vertical scanning circuit 3 while the gates of switches 4-3, 4-4 are connected to the corresponding outputs Oy1-2, Oy2-2, ... OyM-2 of the respective stage of the unit circuit included in the vertical scanning circuit 3. Switches 4-1, 4-2 are connected at one end (for example, source) in common to a terminal to which a field pulse F1 is applied and at the other end (for example, drain) to corresponding vertical scanning pulse application lines Lv (Lv1, Lv2, ..., Lv(M−1), Lv(2M)).

Switches 4-3, 4-4 are connected at one end (for example, source) in common to a terminal 8 to which a second field pulse F2 is applied and at the other end (for example, drain) to corresponding vertical scanning pulse application lines Lv (Lv2, Lv3, ... Lv(2M), Lv(2M+1)). Reading terminals 5 of the respective photosensitive elements PC are connected in common to corresponding vertical scanning pulse application lines Lv1, Lv2 ... Lv(2M-1), Lv(2M), Lv(2M+1) while the output terminals 6 of the photosensitive elements PC are connected in common to corresponding vertical signal output lines Ly1, Ly2, Ly3 . In common connected to horizontal signal output lines Lx are the corresponding drains of horizontal switching MOSTs 2. The gates of horizontal switching MOSTs 2 are connected to the respective stage outputs Ox1, Ox2, Ox3, . . . of the unit circuit included in the horizontal scanning circuit 1 while the sources of the horizontal switching MOSTs 2 are connected to the respective horizontal signal output lines Ly1, Ly2, Ly3.

The specific operation of this embodiment will be described using a timing chart of FIG. 1B on the assumption that the switching elements are P-channel MOSTs. For the purpose of description, a negative logic in which a negative high voltage is defined as "1" and grounding voltage level as "0" is used. N-channel MOSTs are similar if the polarity is reversed.

The vertical scanning circuit 3 is driven by two clock pulses $V\phi 1$, $V\phi 2$ to output two sets of scanning pulses Vy1-1, Vy2-1, .., VyM-1; Vy1-2, Vy2-2, ..., VyM-2, each set of pulses being shifted by a predetermined timing time, to two sets of output terminals Oy1-1, Oy2-1, ..., OyM-1; Oy1-2, Oy2-2, ..., OyM-2 of the respective circuit stages 1, 2, 3, ... M to thereby open and close selector switches 4-1, 4-2, 4-3, 4-4 sequentially. Horizontal scanning circuit 1 outputs horizontal scanning pulses Vx1, Vx2, Vx3 ... to the output terminals Ox1, Ox2, Ox3, ... of the respective circuit stages 1, 2, 3, ... to thereby open and close horizontal switching MOSTs 2 sequentially.

When this solid state image pickup apparatus is operated with the standard television frequency, the output frequencies of the two sets of vertical scanning pulses Vy1-1, Vy2-1, ..., VyM-1; Vy1-2, Vy2-2, ..., VyM-2 are each 15.73 KHz and two field pulses F1, F2 are active with a frequency of 60 Hz in the corresponding fields.

First, in a first field, the first scanning circuit 3 is driven so that one set (in this embodiment, Vh1-2, Vy2-2, ..., VyM-2) of the two sets of output scanning pulses from the respective unit circuit stages of the vertical scanning circuit 3 is generated during a horizontal blanking (H, B) period (approximately 10 μs). Also, in the first field, one (in this embodiment, F2) of two field pulses is set to the "0" level.

Therefore, in the first field, during the horizontal blanking period (approximately 10 μs) the vertical scanning pulses (vy1-2, Vy2-2, ... VyM-2) becomes the "1" level. When the vertical scanning pulses are at the "1" level, the switches 4-3, 4-4 are turned on. However, only the "0" level is applied from the second field pulse application terminal 8 to the vertical scanning pulse application lines Lv2, Lv3, ... Lv(2M+1), so that the respective photosensitive elements PC connected in common to the corresponding vertical scanning pulse application lines Lv2, Lv3, ...,Lv(2M+1) are not read.

On the other hand, outside the horizontal blanking period the vertical scanning pulses Vy1-1, Vy2-1, ... VyM-1 become the "1" level, which turns switches 4-1, 4-2 on and a field pulse $F_1$ is applied from the first field pulse application terminal 7 to the vertical scanning pulse application lines Lv1, Lv2, ...,Lv(2M−1). Thus when the field F1 is at the "1" level, the photosensitive elements PC connected in common to the corresponding vertical scanning pulse application lines Lv1, Lv2, . . . Lv(2M−1) are sequentially read in accordance with corresponding horizontal scanning pulses Vx1, Vx2, . . . VxN.

Thus, in the first field, two rows of photosensitive elements PC are selected simultaneously in the combinations of (Lv1, Lv2); (Lv3, Lv4); . . . ; (Lv(2M−1), Lv(2M)) and optical information of these photosensitive elements PC are read onto the vertical signal output lines Ly1, Ly2, Ly3 . . . .

In the second field, the vertical scanning circuit 3 is driven so that the other set (in this embodiment, Vy1-1, Vy2-1 . . . VyM-1) of the two sets of output scanning pulses from the respective unit circuit stages of the vertical scanning circuit 3 is generated during a horizontal blanking period (approximately 10 μs). In the second field, one (in this embodiment, F1) of the two field pulses is set to the "0" level.

Thus in the second field, during the horizontal blanking period, when the vertical scanning pulses Vy1-1, Vy2-1, . . . ,VyM-1 are at the "1" level, the switches 4-1, 4-2 are turned on and the "0" level is applied from the first field pulse application terminal 7 to the vertical scanning pulse application lines Lv1, Lv2, . . . ,Lv(2m). Thus the respective photosensitive elements PC connected in common to the corresponding vertical scanning pulse application line Lv1, Lv2, . . . , Lv(2M) are not read. On the other hand, outside of the horizontal blanking period, vertical scanning pulses Vy1-2, Vy2-2, . . . VyM-2 become the "1" level, which turns the switches 4-3, 4-4 on and thus a field pulse F2 is applied from the second field pulse application terminal 8 to vertical scanning pulse application lines Lv2, Lv3, . . . , Lv(2M+1). Thus when the field pulse F2 is at the "1" level, the photosensitive elements PC connected in common to the corresponding vertical scanning pulse application lines Lv2, Lv3, . . . , Lv(2M+1) are sequentially read in accordance with the corresponding scanning pulses Vx1, Vx2, . . . VxN.

Thus in the second field, two rows of photosensitive elements PC are simultaneously selected in combinations (Lv2, Lv3);(Lv4, Lv5); . . . ;(Lv(2M), Lv(2M+1)) and the optical information of the photosensitive elements is read out onto the respective vertical signal output lines Ly1, Ly2, Ly3 . . . .

In this embodiment, when reading the last pixels of selected rows is completed, it is necessary to return the photosensitive elements PC in those row to their initial state in order to store optical information entered in the next field period and to return the voltage level of the vertical scanning pulse application lines Lv concerned to the "0" level. Thus the interval during which each of field pulses F1, F2 is at the "1" level is set a time Tf shorter than the interval during which the vertical scanning pulse Vy is at the "1" level. Thus during such time Tf the switches 4 are rendered conductive and the respective field pulses F1, F2 are at the "0" level to thereby reset the respective vertical scanning pulse application lines Lv to the "0" level. This time Tf is required only to be set to a value enough for the voltage on the vertical scanning pulse application line Lv discharges from the "1" level to the "0" level via switch 4 and may be set to a value within the horizontal blanking period (approximately 10 μs).

In the operation of this embodiment, the pixels in the (2M+1)th row in the first field and the pixels in the first row in the second field are not selected, so that the time required for each of the first and (2M+1)th rows to store optical information is twice the time during which the other rows stores optical information and thus larger pixel signals than those in other rows will appear. For these signals, there is no problem if the intervals during which the first and (2M+1)th rows are selected are set within the vertical blanking period (usually about 3 ms=about 40 scanning lines) provided in each field.

Figure 1B:
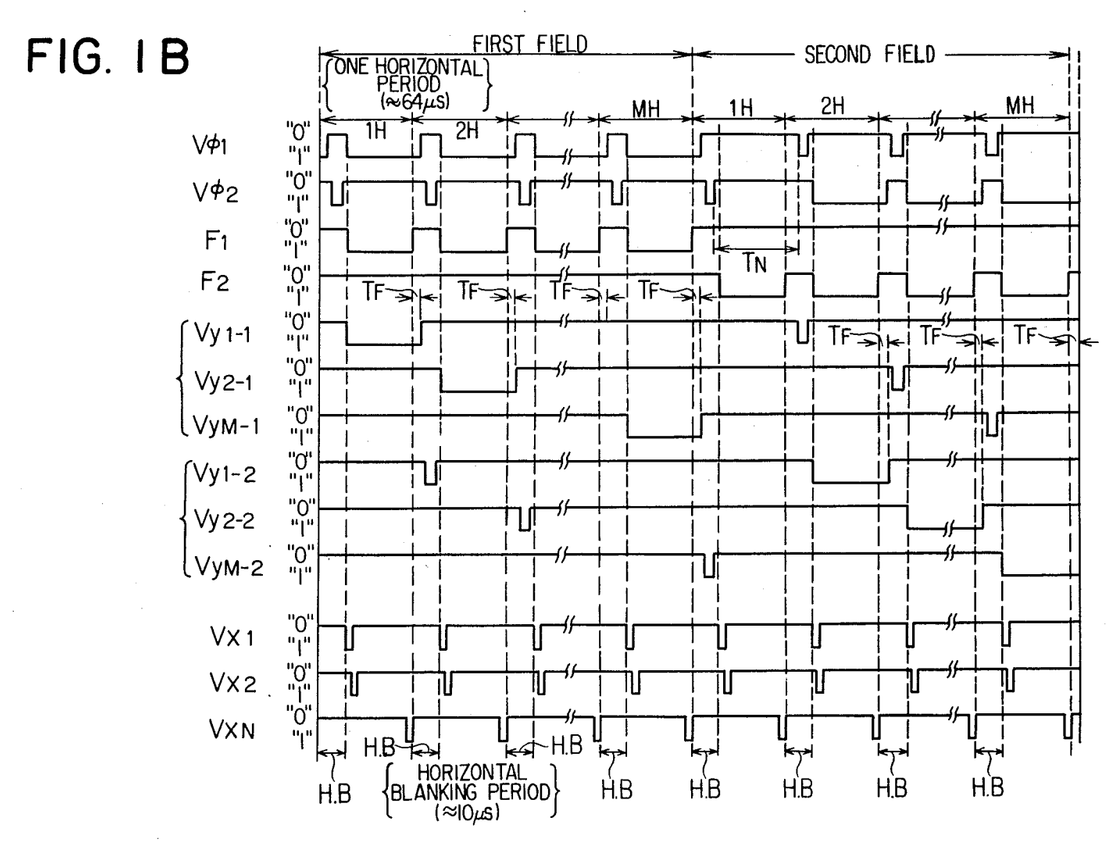
FIG. 1B is a first operational timing chart of the first embodiment.

In addition, in the timing chart of FIG. 1B of this embodiment, there is a clock rest duration TN of one horizontal period (approximately 64 μs) when the first field changes to the second field. This interval TN, however, is accommodated within the vertical blanking period, so that there is no problem.

In the operation of this embodiment, one of the field pulses F1, F2 is shown always as being at the "1" level throughout (one horizontal period (approximately 64 μs)-horizontal blanking period (×10 μs)), but the intervals during which the respective field pulses F1, F2 are at the "1" level and the number of those intervals are not limited to this. In other words, as the photosensitive elements PC described in this embodiment a variety of elements such as MOS type cells, SIT type cells, non-destructive read-out cells as are disclosed in Unexamined Published Patent Application No. 12764/1985 may be used. It is envisaged that, for example, if non-destructive read-out cells are used, two pulses may be applied to these cells as the field pulses in one horizontal period (approximately 64 μs), one for optical information reading and the other for optical information erasing.

In addition, in this embodiment, for example, if non-destructive read-out cells are used as the photosensitive elements PC, it is possible to extract signals easily in a non-interlacing system by changing the timings to drive the vertical scanning circuit 3 and the timings to apply field pulses F1, F2. Namely, according to the timing shown in FIG. 1C, the output terminal Oy1-1 becomes the "1" level as the output from the vertical scanning circuit 3 during the first horizontal period (shown as 1H in FIG. 1C). In this case, the field pulse F1 is at the "1" level, so that switches 4-1, 4-2 are rendered conductive and the photosensitive elements PC in the first and second rows are read out via vertical scanning pulse application lines Lv1, Lv2. Then the output terminal Oy1-2 becomes the "1" level as the output from the vertical scanning circuit 3 in the next horizontal period (shown as 2H in FIG. 1C). In this case, since the field pulse F2 is at the "1" level, the switches 4-3, 4-4 are rendered conductive and the photosensitive elements PC in the second and third lines are read out via vertical scanning pulse application lines Lv2, Lv3.

Figure 1C:
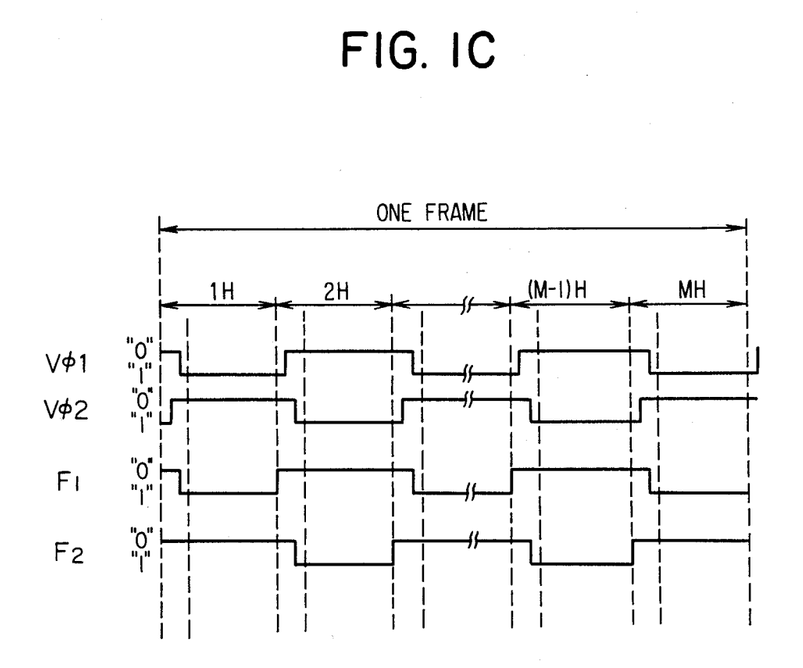
FIG. 1C is a second operational timing chart of the first embodiment.

Therefore, as described above, optical information can be read out of the photosensitive elements PC in a non-destructive manner. If the operation is continued with such timing, first and second rows are read out during a first horizontal scanning period, second and third rows are read out during the next horizontal scanning interval, etc. Thus signals can be read out in a so-called noninterlacing system.

FIG. 2 shows a second embodiment of the present invention.

Figure 2A:
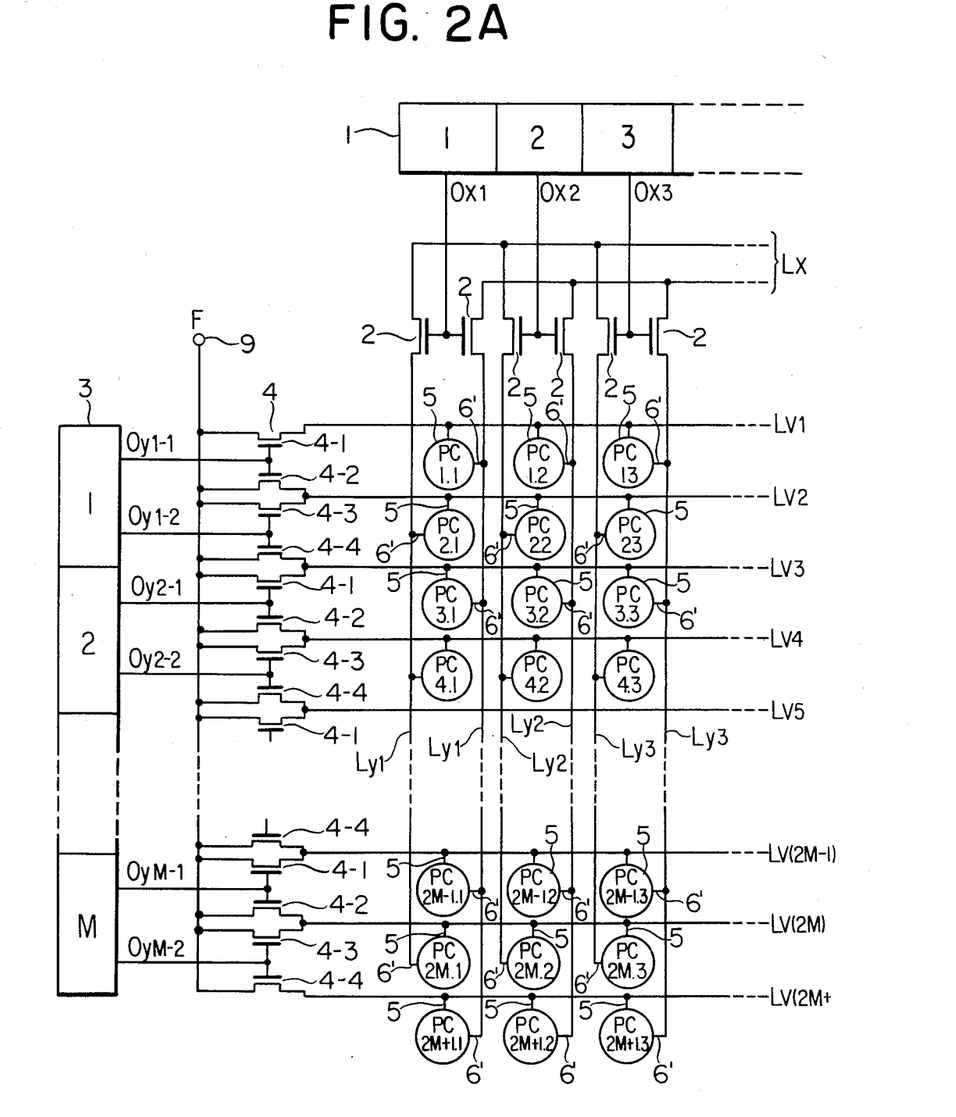
FIG. 2A is a schematic of the circuit of the second embodiment and FIG. 2B is an operational timing chart.

In a schematic of FIG. 2A and FIG. 1A, like numerals denote like or equivalent parts or portions.

Interlacing switches 4 (4-1, 4-2, 4-3, 4-4) are each composed of a MOST. The gates of switches 4-1, are connected to one set of outputs Oy1-1, Oy2-1, . . . OyM-1 of the respective stages of a unit circuit included in vertical scanning circuit 3, and the gates of switches 4-3, 4-4 are connected to the other set of outputs Oy1-2, Oy2-2, . . . OyM-2 of the respective stages of the unit circuit included in the vertical scanning circuit 3. Switches 4-1, 4-2, 4-3, 4-4 are connected at one end (for example, source) in common to a terminal to which a field pulse F is applied and at the other end (for example, drain) to the corresponding vertical scanning pulse application lines Lv(Lv1, Lv2, . . . , Lv(2M+1)).

Figure 2B:
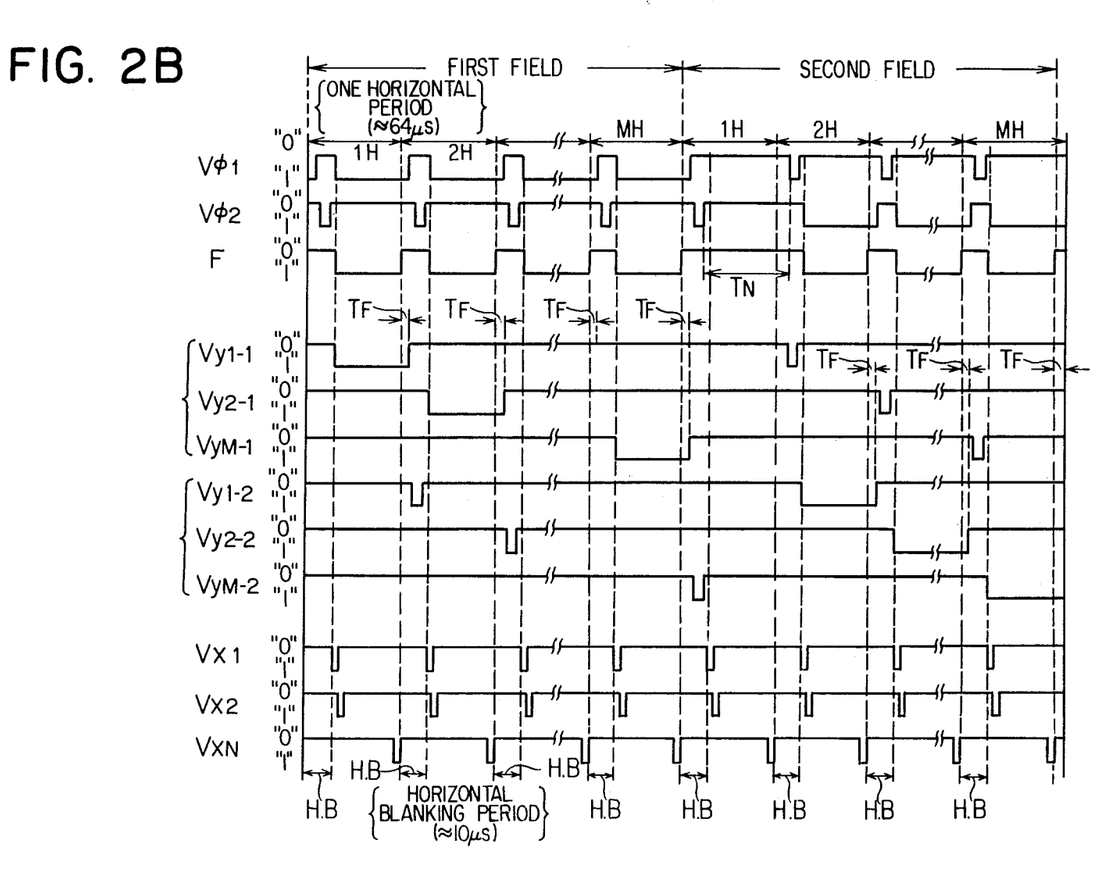

FIG. 2B is a timing chart showing the specific operation of this embodiment. In this embodiment, a field pulse F is only applied via a single terminal 9, so that the circuit structure is further simplified compared to the first embodiment. In FIG. 2B, the basic timing relationship is similar to that in FIG. 1B. It should be noted that in this embodiment the phase relationship between field pulse F and the outputs of vertical scanning circuit 3 shown as Vy1-1 to VyM-1, Vy1-2 to VyM-2 may be changed in each field as shown in FIG. 2B to perform interlacing. Also in the second embodiment, signals may be extracted by changing pulse timings using a noninterlacing system.

FIG. 3 shows a third embodiment of the invention.

Figure 3A:
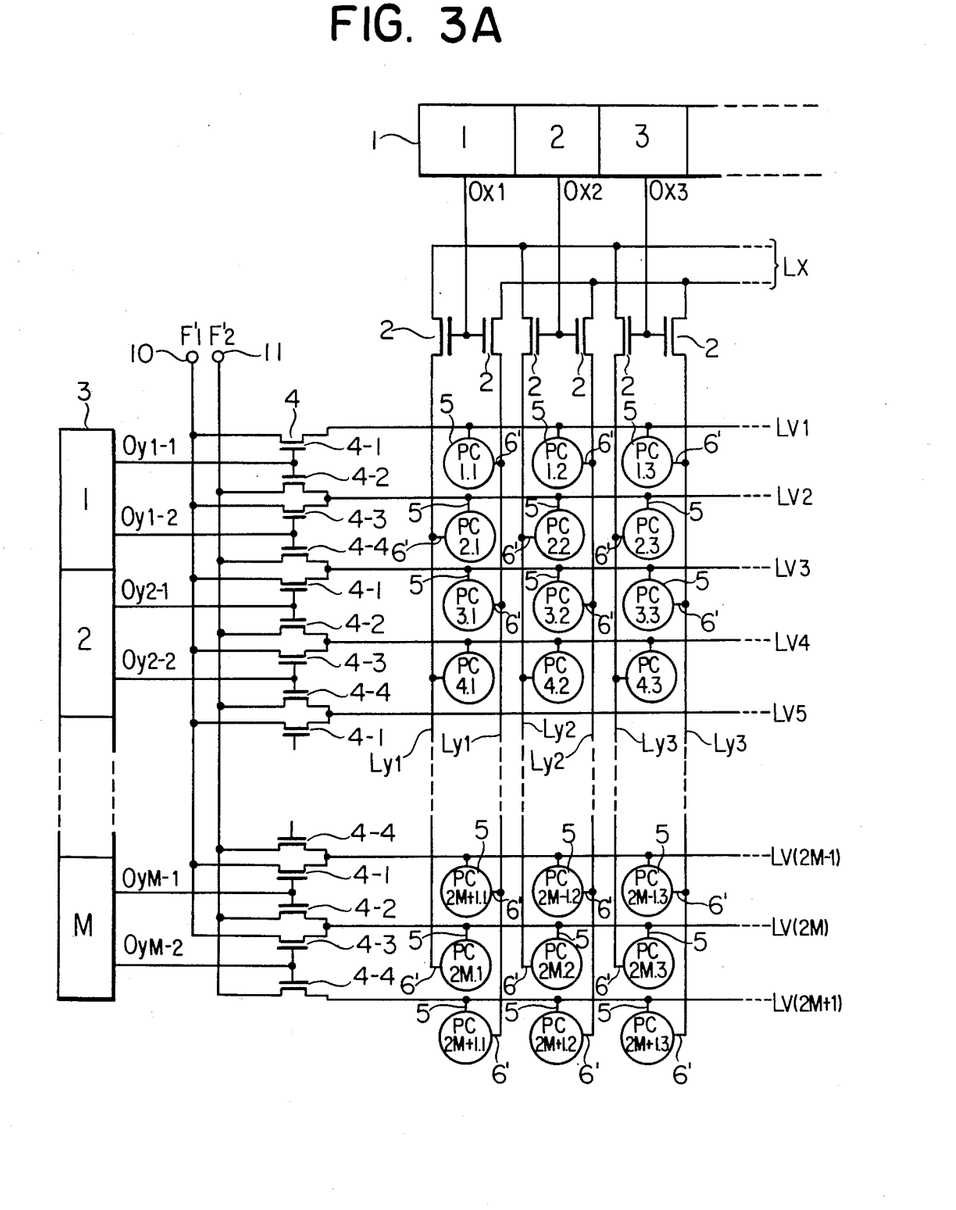
FIG. 3A is a schematic of the circuit of the third embodiment.

In the schematic of FIGS. 3A and 1A, like numerals denote like or equivalent parts or portions.

Interlacing selector switches 4 (4-1, 4-2, 4-3, 4-4) are each composed of a MOST. The gates of switches 4-1, 4-2 are connected to one set of outputs Oy1-1, Oy2-1, . . . OyM-1 of the respective stages of the unit circuit included in the vertical scanning circuit 3. The gates of switches 4-3, 4-4 are connected to the other set of outputs Oy1-2, Oy2-2, . . . OyM-2 of the respective stages of the unit circuit included in the vertical scanning circuit 3. Switches 4-1, 4-3 are connected at one end (for example, source) in common to a terminal 10 to which a first field pulse F1' is applied and at the other end (for example, drain) connected to the corresponding vertical scanning pulse application lines Lv(Lv1, Lv2, . . . Lv(2M)).

Switches 4-2, 4-4 are connected at one end (for example, source) in common to a terminal 11 to which a second field pulse F2' is applied and at the other end (for example, drain) to the corresponding vertical scanning pulse application lines Lv(Lv2, Lv3, . . . Lv(2M+1)).

Figure 3B:
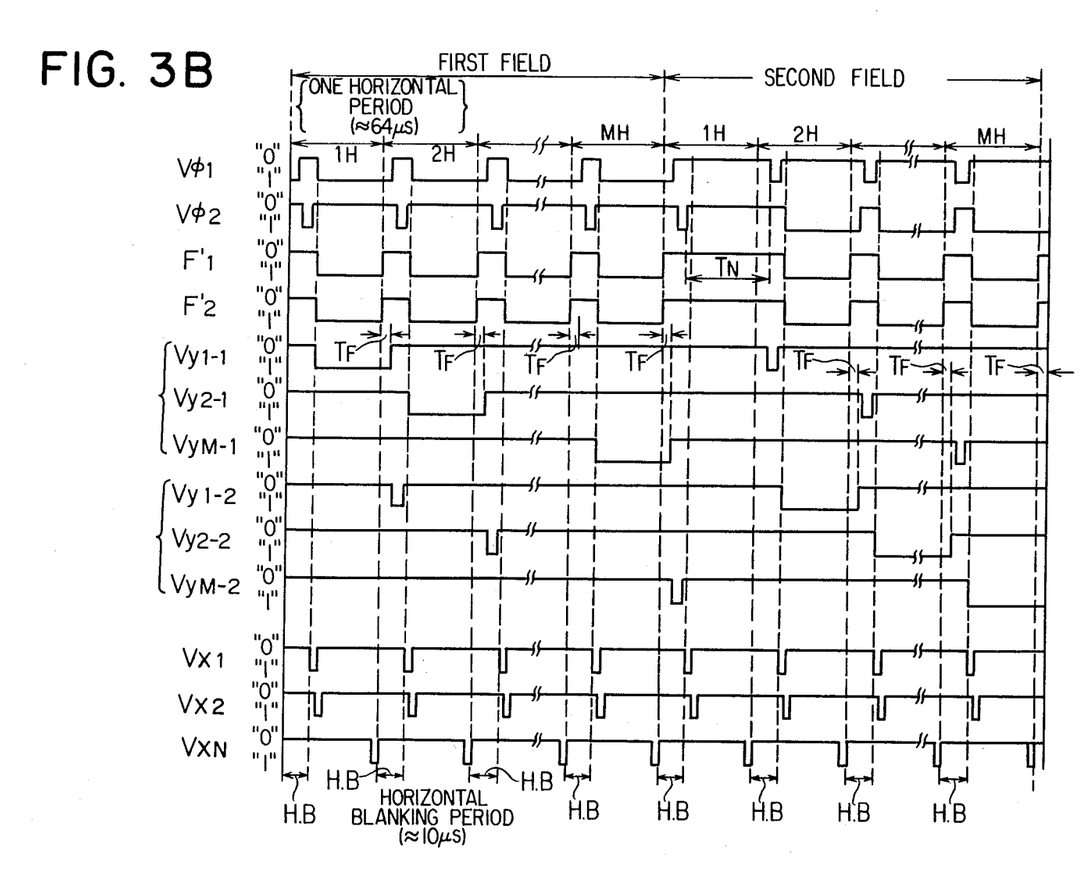
FIG. 3B is a first operational timing chart and FIG. 3C is a second operational timing chart.
Figure 3C:
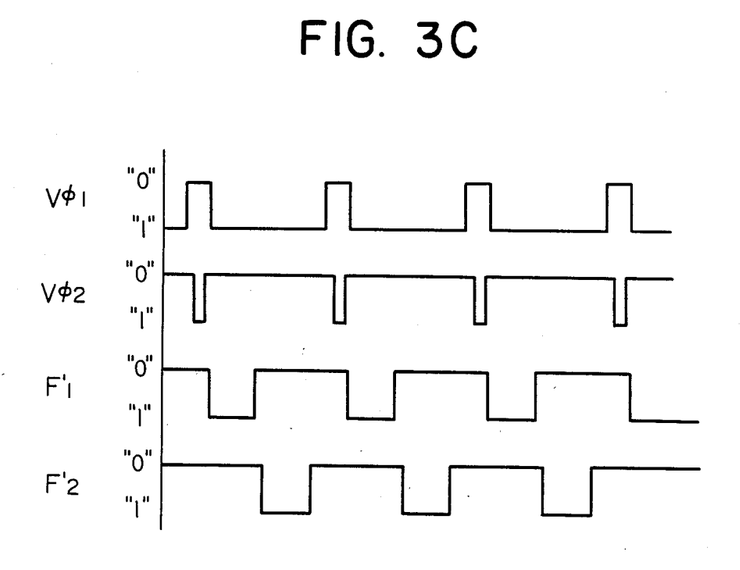

FIG. 3B is a timing chart showing the specific operation of this embodiment. The basic timing relationship in FIG. 3B is similar to that of FIG. 1B. In this embodiment, for example, scanning pulses can be applied independently through two field pulse application terminals 10 and 11 to two vertical scanning pulse application lines Lvi, Lv(i+1) selected simultaneously, so that, for example, if F1', F2' are generated at the timing, for example, in FIG. 3C, signals in two lines can be read out in a time sharing manner using only one signal output line. Also in the third embodiment, signals may be extracted in a non-interlacing system by changing the pulse timing as in the first embodiment.

While in the above embodiment 2-phase drive shift registers are used as the scanning circuit, the scanning circuits are not limited to the two-phase driven shift registers. For example, single-phase driven shift registers may be used.

While MOS transistors are used as the switching elements having a control terminal, the switching elements are not limited to such MOS transistors and may be other switching elements.

In this embodiment, one of two adjoining outputs of the vertical shift register is input to the control terminals of switches 4-1, 4-2 as the switching elements to scan only two adjoining rows while the other of the two adjoining outputs of the vertical shift register is input to the control terminals of switching elements 4-3, 4-4 to scan two rows which are shifted one row relative to the former two adjoining rows.

As described above in detail, in the solid state image pickup apparatus of this embodiment, the gates of four selector switch MOSTs are connected to two corresponding output terminals provided at a respective one of the stages of the unit circuit included in the vertical scanning circuit. The first and second switch MOSTs (corresponding to switches 4-1, 4-2 of the embodiment) and the third and fourth switch MOSTs (corresponding to switches 4-3, 4-4 of the embodiment) are separately opened and closed. The opened and closed intervals of MOSTs in the first field are made different from those of MOSTs in the second field to thereby perform interlaced scanning in which rows are selected two by two in a different combination in each field.

As described with reference to FIG. 1C, interlaced scanning can be easily performed only by changing the timings to drive the vertical scanning circuit and four selector switches.

In addition, in the scanning circuit of the solid state image pickup apparatus of this embodiment, the outputs of the respective stages of the unit circuit included in the vertical scanning circuit are each only required to drive the gates of two switching MOSTs, so that the drive ability of each output circuit is minimized and a layout area per vertical scanning circuit stage is minimized. Consequently, the present embodiments are of highly practical value in rendering higher the resolution of the solid state image pickup apparatus and rendering the apparatus more multifunctional.

What is claimed is:

1. A solid state image pickup apparatus comprising:
   photoelectric conversion elements arranged in horizontal row and vertical column directions;
   a plurality of switching elements each having at least one control terminal, for addressing designated rows of said photoelectric conversion elements; and
   scanning means having a horizontal scanning circuit for scanning the conversion elements horizontally and having a vertical scanning circuit for scanning the conversion elements vertically, one of two adjoining scanning outputs of said vertical scanning circuit being input to respective control terminals of two switching elements for turning on said two switching elements and for reading a first pair of two adjoining rows of said photoelectric conversion elements, and the other of said two adjoining scanning outputs of said vertical scanning circuit being input to respective control terminals of two switching elements for turning on said two switching elements reading a second pair of two adjoining rows of said photoelectric conversion elements,
   said second pair of two rows of photoelectric conversion elements being offset by one row relative to the first pair of two adjoining rows of said photoelectric conversion elements.

2. An apparatus of claim 1, wherein said scanning means includes a shift register.

3. An apparatus of claim 2, wherein said switching elements include a first field effect transistor, a second field effect transistor, a third field effect transistor, and a fourth field effect transistor, the gates of said first and second field effect transistors being connected to one output of a respective one of the stages of said shift register, the gates of said third and fourth field effect transistors being connected to the other output of said respective one of said register stages, the drain of said first field effect transistor, the drains of said second and third field effect transistors and the drain of said fourth field effect transistors being connected to an nth, an (n+1)th and an (n+2)th ones (n is an integer), respectively, of lines to which scanning pulses are applied.

4. An apparatus of any one of claim 3, wherein the source of each field effect transistor is connected to a terminal to which a pulse is applied.

5. An apparatus of claim 3, wherein the sources of said first and second field effect transistors are connected to a first terminal to which a pulse is applied, and the sources of said third and fourth field effect transistors are connected to a second terminal to which a pulse is applied.

6. An apparatus of claim 4, wherein the sources of said first and third field effect transistors are connected to a first terminal to which a pulse is applied, and the sources of said second and fourth field effect transistors are connected to a second terminal to which a pulse is applied.

7. A solid state image pickup apparatus comprising:
   (a) a plurality of photoelectric conversion elements arranged in columns and rows;
   (b) first selective means for simultaneously selecting predetermined n, n being an integer greater than 1, adjoining rows of photoelectric conversion elements to read out said selected predetermined adjoining rows, said first selective means having a first control electrode;
   (c) second selective means for simultaneously selecting n adjoining rows of photoelectric conversion elements, which rows are shifted by m, m being an integer smaller than n, rows relative to the first mentioned n rows of photoelectric conversion elements, said second selective means having a second control electrode; and
   (d) scanning means for inputting control signals sequentially to said first and second control electrodes.

8. An apparatus of claim 7, wherein said first and second selective means each includes n switching means.

9. An apparatus of claim 8, wherein each said switching means includes a MOS transistor.

10. An apparatus of claim 9, wherein the gates of MOS transistors in said first and second selective means are connected in common.

11. An apparatus of claim 7, wherein said scanning means includes a shift register.

12. An apparatus of claim 7, wherein said photoelectric conversion elements each includes a non-destructive read-out element.

13. An apparatus of claim 7, wherein said first and second selective means are driven selectively in each field of a standard television signal.

14. A solid state image pickup apparatus comprising:
photoelectric conversion elements arranged in horizontal row and vertical column directions;
a plurality of switching elements each having at least one control terminal, for addressing designated rows of said photoelectric conversion elements; and
scanning means having a horizontal scanning circuit for scanning the conversion elements horizontally and a vertical scanning circuit for scanning the conversion elements vertically, one of two adjoining scanning outputs of said vertical scanning circuit being input to respective control terminals of a first set of said plurality of switching elements, and the other of said two adjoining scanning outputs of said vertical scanning circuit being input to respective control terminals of a second set of said plurality of switching elements; and
selecting means for simultaneously turning on one of said first and second sets of said plurality of two switching elements as said vertical scanning circuit outputs each scanning output, and therefore scanning a plurality of adjoining rows of said photoelectric conversion elements.

15. An apparatus according to claim 14, wherein said scanning circuit includes a shift register.

16. An apparatus according to claim 15, wherein said switching elements include a first field effect transistor, a second field effect transistor, a third field effect transistor, and a fourth field effect transistor, the gates of said first and second field effect transistors being connected to one output of a respective one of the stages of said shift register, the gates of said third and fourth field effect transistors being connected to the other output of said respective one of said register stages, the drain of said first field effect transistor, the drains of said second and third field effect transistors, and the drain of said fourth field effect transistor being connected to an nth, an (n+1)th and an (n+2)th ones (n is an integer), respectively, of lines to which scanning pulses are applied.

17. An apparatus according to claim 16, wherein the source of each field effect transistor is connected to a terminal to which a pulse is applied.

18. An apparatus according to claim 16, wherein the sources of said first and second field effect transistors are connected to a first terminal to which a pulse is applied, and the sources of said third and fourth field effect transistors are connected to a second terminal to which a pulse is applied.

19. An apparatus according to claim 17, wherein the sources of said first and third field effect transistors are connected to a first terminal to which a pulse is applied, and the sources of said second and fourth field effect transistors are connected to a second terminal to which a pulse is applied.

* * * * *